US007957547B2

(12) United States Patent
Chin (10) Patent No.: US 7,957,547 B2
(45) Date of Patent: Jun. 7, 2011

(54) SOUND PANNER SUPERIMPOSED ON A TIMELINE

(75) Inventor: Robert Chin, Stanford, CA (US)

(73) Assignee: Apple Inc., Cupertino, CA (US)

( * ) Notice: Subject to any disclaimer, the term of this patent is extended or adjusted under 35 U.S.C. 154(b) by 1356 days.

(21) Appl. No.: 11/450,030

(22) Filed: Jun. 9, 2006

(65) Prior Publication Data

US 2008/0002844 A1    Jan. 3, 2008

(51) Int. Cl.
*H04R 5/02*    (2006.01)
(52) U.S. Cl. .......... 381/306; 381/56; 700/94; 345/440.1
(58) Field of Classification Search .............. 700/94; 381/61, 119, 306, 310, 56, 58, 1, 17, 18; 84/600, 625, 645, 653, 660; 345/440.1
See application file for complete search history.

(56) References Cited

U.S. PATENT DOCUMENTS

| | | | | |
|---|---|---|---|---|
| 4,378,466 A * | 3/1983 | Esser | .............................. | 345/22 |
| 4,691,358 A * | 9/1987 | Bradford | .......................... | 381/12 |
| 5,204,969 A * | 4/1993 | Capps et al. | ................... | 704/278 |
| 5,812,688 A * | 9/1998 | Gibson | .......................... | 381/119 |
| 6,798,889 B1 | 9/2004 | Dicker et al. | | |
| 7,548,791 B1 * | 6/2009 | Johnston | .......................... | 700/94 |
| 7,555,131 B2 * | 6/2009 | Hollowbush et al. | ........... | 381/58 |
| 7,698,009 B2 * | 4/2010 | Cotey et al. | ...................... | 700/94 |
| 2005/0047614 A1 | 3/2005 | Herberger et al. | | |
| 2006/0180007 A1 * | 8/2006 | McClinsey | ....................... | 84/645 |
| 2008/0041220 A1 * | 2/2008 | Foust et al. | ..................... | 84/625 |

* cited by examiner

*Primary Examiner* — Vivian Chin
*Assistant Examiner* — Jason R Kurr
(74) *Attorney, Agent, or Firm* — Hickman Palermo Truong & Becker LLP (57) ABSTRACT

Techniques described herein allow a user to create and modify a sound design in a user interface. For example, a user imports a sound file into the user interface, where the sound file is displayed graphically along a timeline. The user can then insert multiple control points along the timeline. The control points display the sound properties of the sound file at the selected points in time along the timeline. Accordingly, the user uses controls provided in the user interface to adjust and modify the sound properties displayed on a control point. The modifications the user makes to the sound properties are saved to the sound file.

34 Claims, 4 Drawing Sheets

SOUND PANNER SUPERIMPOSED ON A TIMELINE

BACKGROUND

Good sound and audio can enhance the storytelling of a movie and/or song. For example, because movie theaters typically have higher quality audio systems, going to a movie theater to see a movie can enhance the overall entertainment experience. Lately, home audio system quality has improved. In some cases, home audio systems have improved to the point that they can provide an entertainment experience similar to that of commercial systems. To make use of the higher quality audio systems, the audio portion of entertainment media is often designed with current commercial and home audio systems in mind.

For example, movies released on digital versatile disks (DVDs) typically include audio data that has been designed to take full advantage of modem digital surround sound systems. To take advantage of digital surround sound systems, the audio portion of a DVD movie is designed to send specific audio data to specific speakers during the movie. When done right, the sound design creates the impression that sounds are coming from specific location on- and off-screen. The sounds help the movie watcher feel like they are part of the movie.

As an example, suppose a movie shows a bus driving across the screen. As the bus appears on the left-hand side of the screen, audio data is sent to a left-hand speaker, giving the impression that the bus is coming from the left. As the bus crosses the screen, further audio data is sent to the left-hand speaker, which reduces the volume of the bus sound output from that speaker. Simultaneously, other audio data is sent to a middle and right-hand speaker to output the sound of the bus moving. This additional audio data gives the audio impression that the bus is moving across the screen. The audio data acts as a cue for the movie watcher to pay attention to the bus as it enters on the left-hand side of the screen and crosses the screen. Moreover, the audio data provides the sensation that the user is observing an actual bus passing by in front of them. Details like these enhance the overall entertainment experience.

The process of developing a good sound design typically involves "automating" audio data. Sound automation generally refers to the process of editing and adjusting the audio properties of a sound at specific points in time, and then automatically generating the appropriate data values in between the specified points. Currently, much of sound automation is done using sound automation software.

Sound automation software typically provides tools so a user can record (or import) sounds into a user interface and model the sound, adjusting audio properties of the sound at a various control points. For example, using sound automation software, a user can adjust the volume of the sound at a given point in time, how the sound pans, the cutoff frequencies for audio filters, tempo, pitch, the location of the sound, and a number of other sound properties.

Figure 1:
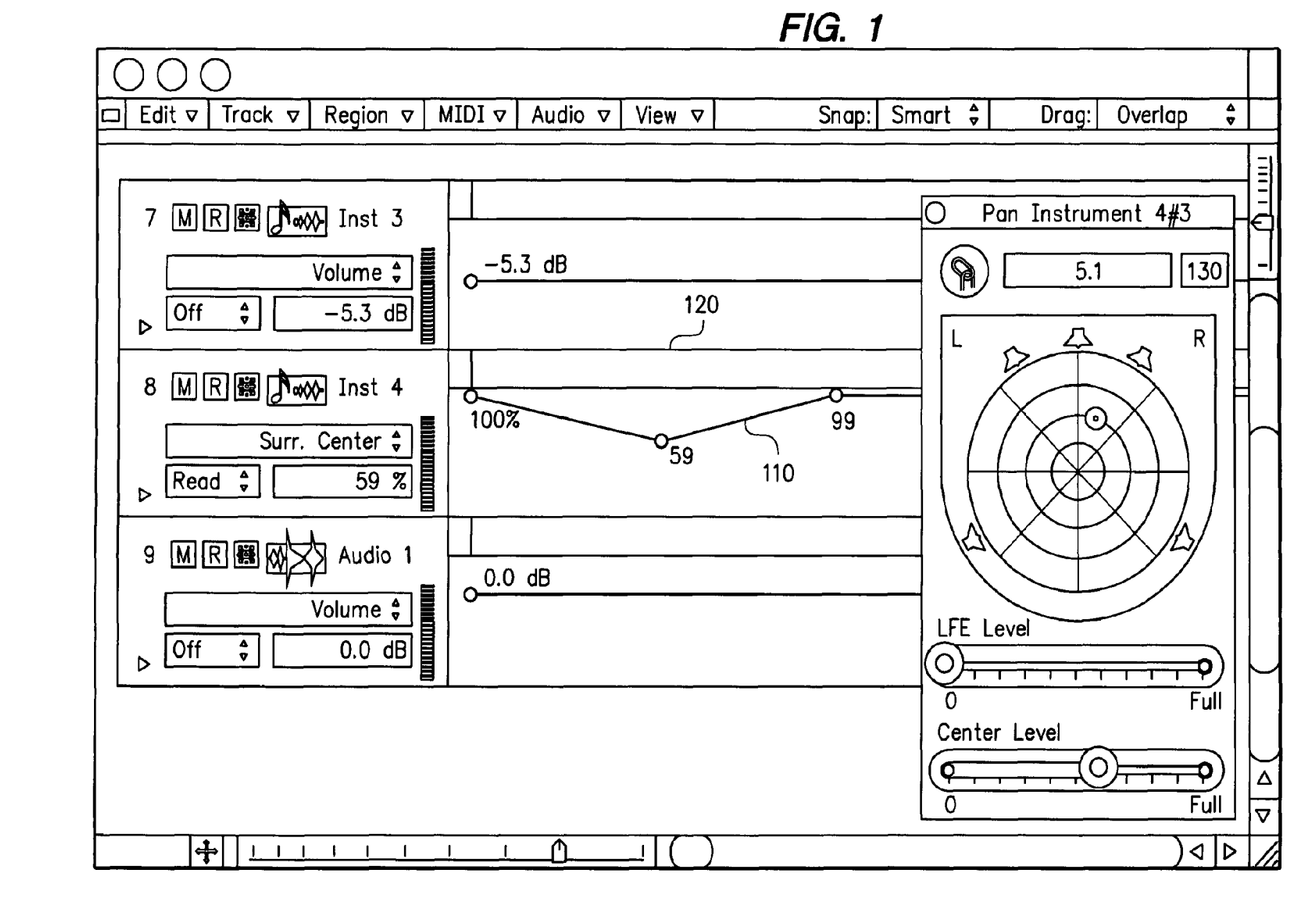
FIG. 1 is a depiction of a sound automation user interface.

FIG. 1 illustrates an example user interface 100 for sound automation software. In this example, a sound file has been imported into the program. The sound is illustrated as a waveform 110 along timeline 120. In this user interface 100, to automate the sound, a user opens a separate pan instrument 130. The pan instrument allows the user to modify the audio properties of the sound wave at specific points in time.

The problem with this and other sound automation software is that they only provide the ability to create and adjust one control point at a time. Basically, they do not provide the capability to create and adjust multiple control points in a single user interface. As a result, the process of connecting a control point to its predecessor and/or successor control point is time-consuming and subject to error because each control point is opened and modified independently of all other control points in the user interface. In addition, since each control point is independent of the other control points along a sound wave, the transition of sound between control points is often disjointed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Tools and techniques described herein provide mechanisms which allow a user to perform sound automation in a multi-dimensional surround sound environment. Accordingly, the mechanisms allow a user to graphically set and adjust the audio properties of a sound file, or to set and adjust the parameters to a set of instructions that can be used in the future to set and adjust the audio properties of the sound file. For example, in one embodiment, a sound automation tool with a sound-editing user interface that displays a sound to a user along a sound timeline. In the sound automation tool, the user can access user interface controls or other similar mechanisms to insert one or more control points along the sound timeline. Once a control point has been inserted along the sound timeline, in one embodiment, a user may access user interface controls or other mechanisms to move the control points along the sound timeline. Basically, the user can modify a control point's temporal location.

In one embodiment, the mechanisms provide a way to mark and adjust sound property settings on a control point. Those mechanisms include property markers. A property marker indicates the value of a sound property of the sound wave at a specific control point. For example, suppose a control point is represented in the sound-editing user interface as a disk object. In this example, the property marker on the control point disk represents at least one sound property value for the sound file at that particular point along the sound timeline. In one embodiment, multiple sound properties may be shown on a control point.

Additional mechanisms are provided that allow a user to modify the property markers on control points. By adjusting the property markers on control points, a user adjusts the audio property settings of the sound file. The adjusted settings may eventually be saved and encoded in the sound file.

Further mechanisms are provided that allow a user to adjust the transition of sound properties between control points. For example, in one embodiment, the sound-editing user interface automatically connects one new control point to its neighboring control points. Once two or more control points are connected, other mechanisms are provided that allow the user to modify the way the sound transitions from one control point to the next in the sound file.

Other techniques described herein provide mechanisms that allow a user to zoom in or zoom out on a displayed sound file. In one embodiment, as a user zooms out, control points may begin to overlap each other. Accordingly, mechanism determine which overlapping control points should be displayed.

User Interface

To perform sound automation, a user records or imports a sound file into a sound automation tool. The sound automation tool can be similar to the sound automation tool illustrated in FIG. 1. In one embodiment, the sound automation tool includes a sound-editing user interface that represents the sound file as a sound wave along a timeline.

In one embodiment, the sound editor can change how a sound file is displayed in the sound-editing user interface. For example, the sound editor may use controls provided in the sound-editing user interface to zoom in or out on a section of the sound wave. Furthermore, the sound-editing user interface may provide controls that allow the sound editor to switch between various sound properties. In one embodiment, each sound property may have a representative waveform. For example, in one mode, the sound-editing user interface may display a waveform that represents the location of the sound in a surround sound environment. In another mode, the sound-editing user interface displays a waveform that represents the volume of the sound as it changes over time. Other modes in the sound-editing user interface may display other sound properties.

In the sound-editing user interface, the user is provided with controls that allow the user to insert control points along the sound wave's timeline and modify the sound properties of the sound file at selected control points. In one embodiment, a control point includes sound property markers that indicate the settings for a sound property at the control point. Moreover, the control point or, alternatively the sound-editing user interface, also can include user interface controls that allow the user to adjust the sound properties of the sound file at the control point. For the purpose of explanation, the user that performs sound automation shall be referred to herein as the "sound editor".

Accordingly, in one embodiment, the sound editor may adjust sound properties such as the source of a sound, its volume, how it pans from one location to another, and other similar audio features, by modifying the position of sound property markers using user interface controls on the control point and the sound-editing user interface.

Additionally, in one embodiment, the sound-editing user interface provides mechanisms to control connected control points along the timeline and adjust the transition of the sound as it moves temporally from one control point to the next.

Figure 2A:
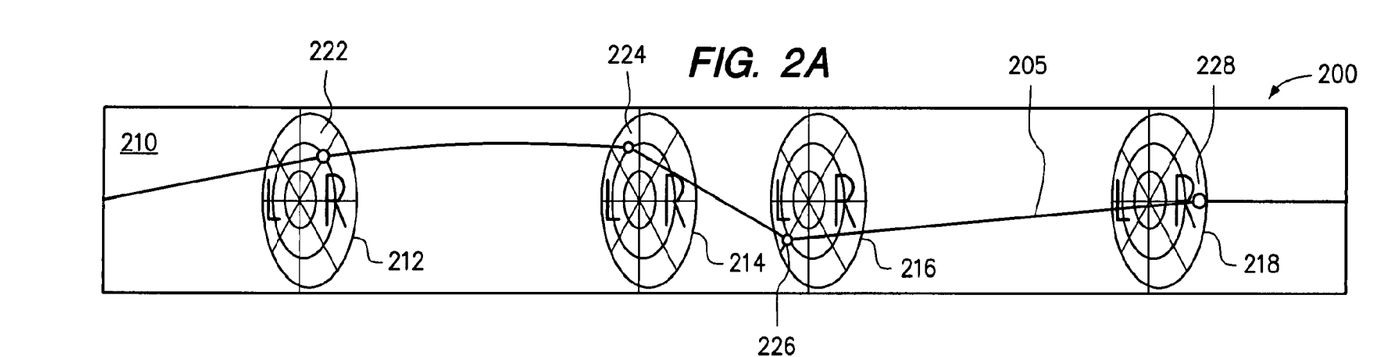
FIG. 2A is a depiction of an example user interface for inserting control points in connection with a sound file displayed along a timeline, according to an embodiment of the invention.

FIG. 2A illustrates an example sound-editing user interface 200 in a sound automation tool. The sound-editing user interface provides controls that allow the sound editor to insert control points on a sound wave 205 representing a particular feature of the sound file. In one embodiment, the sound-editing user interface 200 includes a sound-editing box 210, which displays the sound file in waveform. In other embodiments, other user interface controls may be displayed in the sound-editing user interface 200. For example, other user interface controls may be added to the sound-editing user interface to indicate features such as additional channels, inputs, dynamics, mixer controls, equalizer, playback velocity, additional tracks, etc. In one embodiment, a sound-editing user interface includes at least one control to switch between one or more editable sound properties. For example, the sound editor may initially want to edit the location of a sound (e.g., where the focal point of the sound is after transmission). Accordingly, the sound-editing user interface may include a control that allows the user to switch to a location editing mode. After editing the sound location, the sound editor may wish to edit the volume of the sound at certain control points. In one embodiment, a user-interface control allows the sound editor to switch the sound-editing box to a volume editing mode.

Note that, according to one embodiment, the sound-editing user interface 200 may be part of a larger graphical user interface that includes many of the features illustrated in FIG. 1. For example, in one embodiment of FIG. 1, if a user clicks on sound wave 110, then a sound-editing box, such as sound-editing box 210 illustrated in FIG. 2A is opened and displayed to the sound editor. The sound editor may then add control points and adjust sound properties from the sound-editing box as described herein.

In FIG. 2A, sound-editing box 210 displays sound wave 205 along a timeline and provides controls that allow the sound editor to insert, edit, and delete control points along the sound wave. In one embodiment, the sound wave 205 represents a sound file. The sound file 205 may include any type of imported and/or recordable audio cue. For example, the sound file can include a single note, a series of notes, a single sound, a series of sounds, a song, a portion of a song, etc. Additionally, the sound file may have file-wide properties associated with it. For example, the sound file may have audio data that is supposed to be played back through certain predetermined channels. Such file-wide information can be encoded with the sound file.

In one embodiment, the sound wave 205 representing the sound file is shown horizontally traversing the sound-editing box 210. In alternative embodiments, the sound wave 205 may be displayed vertically or in some other way. In the embodiment illustrated in FIG. 2A, the sound wave starts at one end of the sound-editing box 210 (e.g., the far left side of the sound-editing box) and continues to the other end. The sound-editing box 210 can include a waveform representing the entirety of the sound being automated, or, alternatively, the sound-editing box 210 can include a waveform that represents only a portion of the sound file. In other embodiments, the sound file or portions thereof can be represented by spectrograms, temporal markings, or other similar visual representations.

Within the sound-editing box 210, input (such as mouse clicks on the sound wave, clicks on separate user interface controls, keystrokes, or input from other types of input devices) allow the sound editor to insert commands to create new control points along the sound wave 205. For example, in one embodiment, to insert a new control point, the sound editor simply mouse-clicks on a location along the sound wave 205, and a new control point is inserted in the sound-editing box 210 at the clicked location.

Guidance Markers

The sound-editing user interface may include guidance markers, such as a grid, coordinates, or lines, to help the sound editor accurately position control points. In one embodiment, guidance markers are listed along a timeline in the sound-editing box 210. Numbers may be displayed adjacent to the guidance markers. The number displayed adjacent to a guidance marker indicates a relative time associated with a guidance marker. For example, assume the sound wave 205 is a two minute sound clip of a baby crying, and that the sound editor wants to edit the location of the sound 30 seconds into the sound clip. In this example, assume the timeline shows guidance markers at ten-second time intervals, listed chronologically along the top of the sound-editing box 210. Accordingly, the sound editor points and clicks on the guidance marker located at the 30-second time interval to create the new control point.

In alternative embodiments, the time intervals between the guidance markers may be different. In addition, in some embodiments, the sound editor can zoom in or out on the sound wave. In response to such zoom operations, the time intervals between the displayed guidance markers may change.

Control Points

In one embodiment, control points 212, 214, 216, and 218 are shaped like disks. According to one embodiment, the control points are also transparent (or at least partially transparent) so the control points can overlay each other and still display useful data to the sound editor. In other embodiments, the control points may be shaped differently. For instance they may be another type of geometric object, such as a square, triangle, rectangle, etc.

In one embodiment, the control points disks 212, 214, 216, and 218 behave similarly to pan instrument 130 illustrated in FIG. 1 (e.g., the control point disks represent the two-dimensional spatial location of the sound at a particular point in time). In alternative embodiments, the control points may have a different appearance. For example, they may be shaped as spheres to represent a three-dimensional spatial location of a sound at a particular point in time. In one embodiment, the control points are presented as disks as illustrated in FIG. 2A. In another embodiment, the control points are spherically shaped, as in FIGS. 3A, 3B, 3C, and 3D.

In one embodiment, control points are automatically created for a sound file based on algorithms based on external data. For example, motion tracking algorithms and motion data can be used to automatically adjust the location of a sound source in the sound file over time. In a movie environment, such algorithms allow sound to follow and track the movement of objects and visuals on screen.

Control Points That Display Sound Properties

In one embodiment, control points 212, 214, 216, and 218 include user interface controls that display the sound properties of the sound file at the particular points in time represented by the control points. User interface controls that display sound properties of the sound file, relative to a control point, are referred to herein as property markers.

In FIG. 2A, control points 212, 214, 216, and 218 include property markers 222, 224, 226, and 228, which respectively show where the sound wave 205 crosses each control point. A property marker represents the value of the sound property on the control point. By displaying the property markers on the control points, the sound-editing box 210 provides an indication of what the current sound property settings for the sound file are. For example, in one embodiment, property markers 222, 224, 226 and 228 indicate the current settings for a sound property of control points 212, 214, 216, and 218, respectively.

In one embodiment, when a new control point is created, the sound automation tool determines an initial value for the property marker on the newly-created control point. The initial value may be set by the sound editor or by the sound automation tool. Alternatively, the property marker may be generated based on sound properties associated with the sound file. For example, when a new control point is created, the sound wave 205 may be analyzed by the sound automation tool to determine a sound property setting already encoded with the sound file itself. Once an initial value has been determined and the control point created, the sound-editing user interface 200 displays the control point with its associated sound property settings in the sound-editing box 210.

In addition, in one embodiment, sound properties may be displayed relative to a base value. The base value generally refers to a sound property value to which all other sound property values of a particular type are compared. The base value of a sound property may be preset by the sound automation tool, configured by the sound editor, extracted from the sound file itself, or determined in some other way. For example, in FIG. 2A, the center of the control point disks 212, 214, 216, and 218 represents the base value for a spatial location sound property. Basically, when a sound editor adjusts the location of a sound at a control point, the adjustments are made relative to the base value or center point of the disk. In FIG. 2A, assume the center of the control point indicates the base position where a user is expected to be in a surround sound environment. Accordingly, the sound editor adjusts the location of the sound at a control point by moving the property marker relative to the base value (e.g., the center of the control point). Thus, if the sound editor wants a sound to come from the left at a particular point in time, then the sound editor adjusts the property marker so that it is positioned to the left of the center point on a control point. The sound automation tool automatically applies the new sound property setting to the sound file.

Figure 2B:
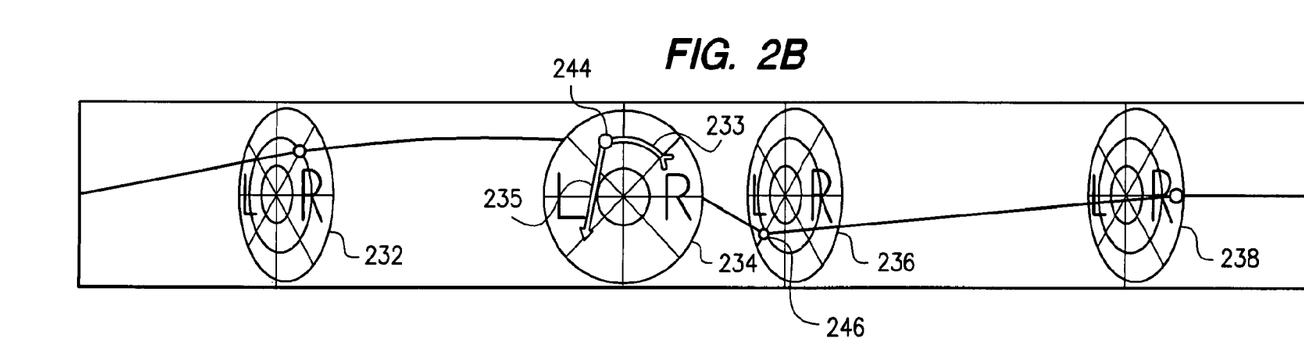
FIG. 2B is a depiction of an example user interface for modifying property markers on the inserted control points, wherein the property markers correspond to sound property setting extracted from the sound file, according to an embodiment of the invention.

Referring to FIG. 2B, it illustrates a control point 234 that includes property marker 244. Property marker 244 illustrates where the sound wave 205 crosses control point 234 and represents a sound property setting for that control point. In this example, to adjust the sound properties at control point 234, the sound editor uses user interface controls provided in the sound-editing box 210 to adjust the location of the property marker. Alternatively, the property marker 244 itself constitutes a user interface control and its position on the control point represents its value. Accordingly, the sound editor may drag property marker 244 from one location to another on the control point.

Control Points With Controls to Modify Sound Properties

In one embodiment, the control points include user interface controls that allow the sound editor to modify the sound properties. The user interface controls provided on the control points to modify a sound property may vary. For example, a control point may include a sound location property marker and a panning property marker on the same control point.

In one embodiment, a property marker may indicate the sound property setting by a numerical value. To edit the setting for the sound property, the sound editor clicks on the numerical value and manually enters a new value for the sound property. Alternatively, the property marker is a user interface control, such as an adjustable point, a pull-down menu, sliding bar, or other type of control, which the sound editor can manually adjust using a mouse or other of input device.

In one embodiment, when the property markers on the control points are adjusted, the adjusted settings are immediately applied by the sound automation tool to the sound file. By applying the modifications, the sound editor may playback the sound in order to determine if further adjustments are needed to the sound. According to one embodiment, the adjustments are performed on a temporary file until the sound editor saves the changes to the sound file.

Manipulating Control Points

In one embodiment, the control points may be rotated to show the control point from various angles. Showing the control points at various angles gives the sound editor more control over the sound properties. An example of a control point shown at a different angle is illustrated in FIG. 2B. In FIG. 2B, control point 234 has been rotated to show the face of the control point disk. For example, in one embodiment, the control point may be rotated to any angle along the X- or Y-axis. As a part of the user interface, the sound-editing box 210 can animate the control point as it rotates to move faster or slower according to the sound editor's predilection. For example, the control point animation can include rotating the control point in slow motion. In one embodiment, the rotation of the control point happens automatically when the control point is to be manipulated. In another embodiment, the control point rotates when a user selects a separate user interface control.

Once control points have been created, in one embodiment, a control point can be moved along the sound timeline by the sound editor using various user interface controls in sound-editing box 210. For example, suppose the sound editor creates control point 212 at time interval 10 along sound wave 205. In one embodiment, the sound editor can then click and drag the newly-created control point 212 from one location to another along the timeline in the sound-editing box 210.

In one embodiment, when the sound editor moves a control point, the sound properties defined at the control point remain unchanged after the move. Alternatively, the sound properties are automatically adjusted to display the sound property settings at the control point's new location on the sound wave 205.

Specifying Transitions Between Control Points

The sound-editing box 210 can also provide user interface controls that allow the sound editor to modify the transition of the sound wave 205 from one control point to the next control point. To illustrate, referring to FIG. 2B, control point 234 is facing the sound editor. From this perspective, the sound editor may adjust not only the property marker, but also control point vector 235 between control point 234 and control point 236. Control point vector 233 illustrates the sound transition from control point 232 to control point 234. Basically, control point vector 235 illustrates the direction and change that occurs to a sound property of the sound wave 205 as the sound wave transitions from control point 234 to control point 236.

The endpoint of the control point vector 235 corresponds to property marker 246 on control point 236. In one embodiment, the sound editor, using user interface controls provided by the sound editing box 210, may adjust the control point vector to change the sound transition from control point 234 to control point 236. For example, the sound editor could use interface controls provided by the sound-editing box 210 to curve the vector to the left or right, or in some other way. In one embodiment, control point vector 235 is itself a user interface control that the sound editor may modify by clicking on it. Note that in this embodiment modifying control point 235 may also result in moving, rotating, or modifying control point 236.

Multi-dimensional Automation

Figure 3A:
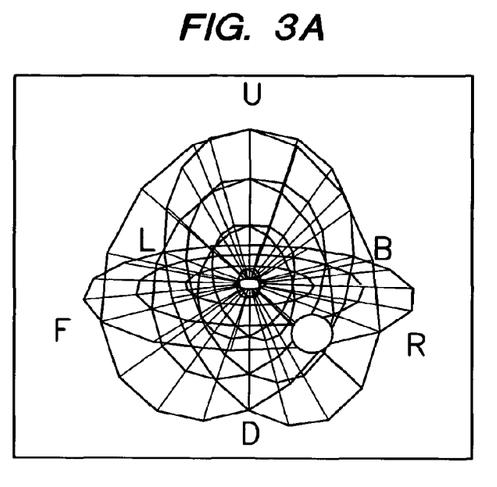
FIGS. 3A, 3B, 3C, and 3D are depictions of example user interfaces for inserting and modifying control points in three-dimensions, according to embodiments of the invention.
Figure 3B:
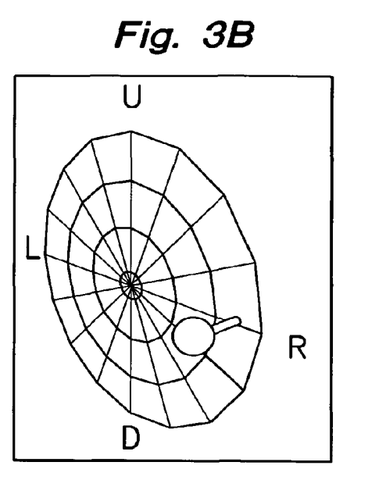
Figure 3C:
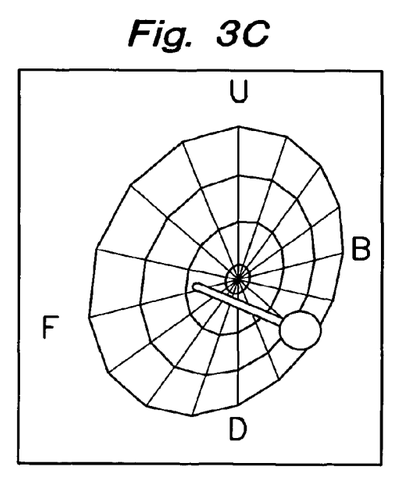
Figure 3D:
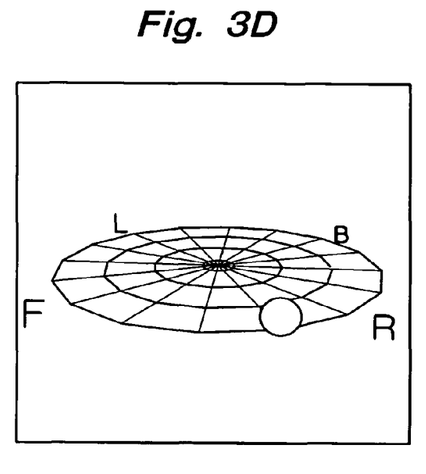

In one embodiment, sound automation may be performed in three or more dimensions. For example, control points may be represented as three-dimensional spheres. In other embodiments, the control points may be in another three-dimensional shape, such as a cube or dodecahedron. FIGS. 3A, 3B, 3C, and 3D illustrate various examples of three-dimensional control points. The process of creating and adjusting sound properties on a three-dimensional control point is similar to the process for editing a sound file in a two-dimensional plane. For example, in a 3D embodiment, sound properties may be adjusted by creating three-dimensional control points and using user interface controls provided by a sound-editing interface to adjust property markers associated with the three-dimensional user interface. More specifically, in a 3D embodiment, FIG. 3A illustrates a control point in a normal state (e.g., when a sound editor creates a new control point). FIGS. 3B, 3C and 3D illustrate control points in various modes that allow the sound editor to modify the position of property markers. In one embodiment, the modifications to the position of the property markers are confined to a single two-dimensional plane. In other embodiments, the modifications may be made in a three-dimensional space.

Post-editing Operations

In one embodiment, the sound-editing box 200 includes user interface controls that allow the sound editor to save changes once the sound editor has edited the sound properties of the sound file. In one embodiment, the sound automation tool saves the new settings and changes to the sound file. In one embodiment, the sound file can then be exported to and applied to a variety of multimedia content. For example, once the sound properties have been edited, the sound editor may export the sound file to 3D animation movie software. The 3D animation movie software imports the new sound file and matches the sound file to visual objects in the 3D animation movie. In one embodiment, the control points can be associated with particular objects in the 3D animation movie.

Procedure for Automating a Sound Using Control Points

Figure 4:
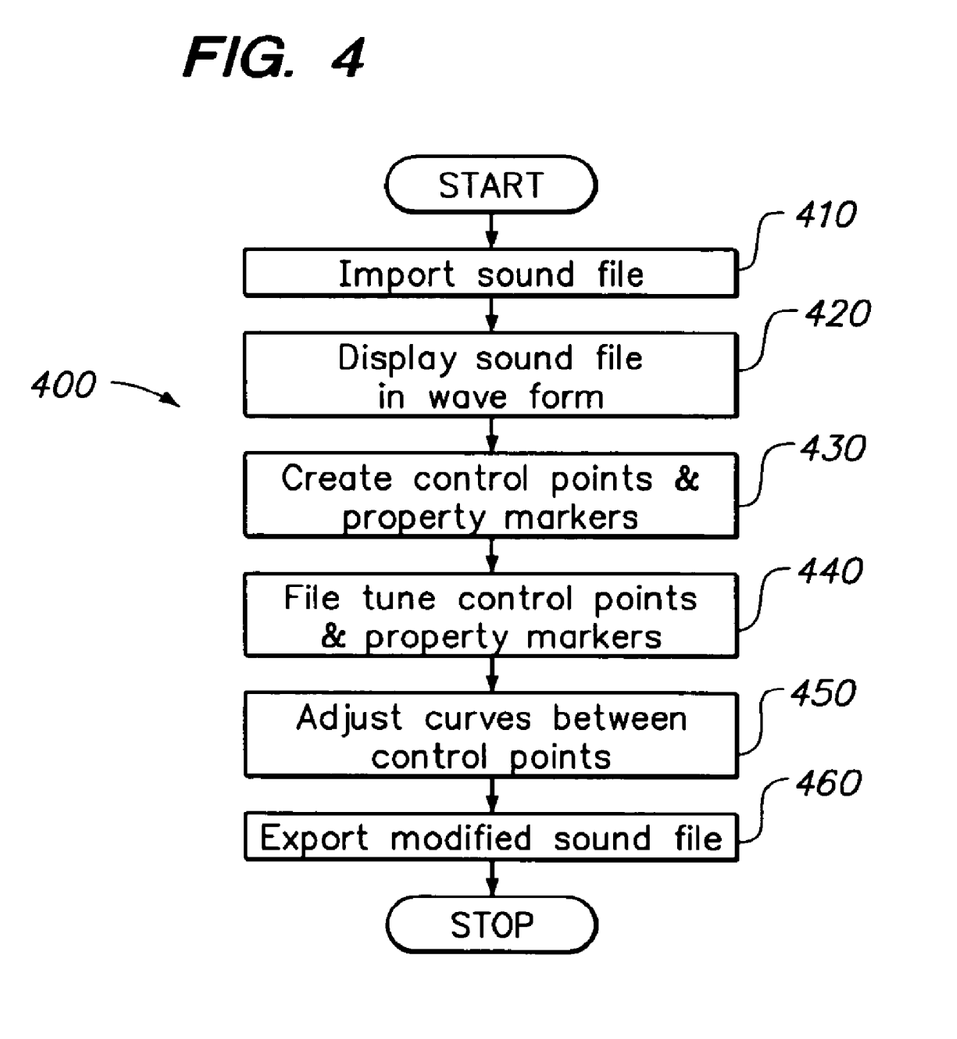
FIG. 4 is a flowchart illustrating a procedure for using a user interface to interactively automate a sound file using a sound automation tool.

Turning to FIG. 4, it is a flowchart illustrating a procedure 400 for using a user interface to interactively automate a sound file using a sound automation tool. For example, the procedure 400 allows a sound editor to set and adjust sound properties, such as how and where a sound travels, in a particular sound file design.

At step 410, the sound editor opens a sound file in the sound automation tool. The sound automation tool includes, among other things, a sound-editing user interface and the necessary logic to identify and modify sound property settings. In one embodiment, the sound-editing user interface of the sound automation tool is similar to the sound-editing user interface 200 illustrated in FIG. 2A. The step of opening the sound file may include using sound recording controls provided in the sound-editing user interface to record and create a sound. Alternatively, the step of opening the sound file includes using user interface controls to import an already recorded sound into the sound-editing user interface.

The content and format of the sound files opened in the sound automation tool may vary from one implementation to the next. For example, the sound automation tool may recognize multiple sound file formats, such as MP3, MID, MIDI, WAV, WMV, etc. In one embodiment, the format of the sound file may include encoded data that defines the sound properties for the sound, such as what channel a particular portion of a sound is sent on, the volume of the sound at a particular point in time, the sound's location, etc. In a movie production embodiment, the sound file may represent the sound made by a single object or character in the movie. Alternatively, it may include the sounds of various objects and/or characters in a movie.

For example, assume that a sound editor named Bob wants to create and automate sound for a new 3D-animated movie about buses taking over the world. As part of the process of providing sound effects for the movie, Bob generates and records a number of sound files. The recorded sounds during movie production will be associated with characters, objects, and scenes in the movie. Among the sound files recorded by Bob are files representative of a number of bus sounds. For example, Bob has captured the sound of a bus engine starting, accelerating, moving, the bus doors opening and closing, etc.

When Bob is ready to adapt and automate the sounds for the movie, he opens them in the sound automation tool. In one instance, Bob opens a ten second clip of a bus moving. Bob would like to associate the bus-moving-sound with an animated bus as it crosses the movie screen from left to right.

In FIG. 4, at step 420, the bus-moving sound file is displayed in the sound automation tool's sound-editing user interface. In one embodiment, the sound file is displayed as a waveform along a timeline. FIGS. 2A and 2B illustrate example sound waves displayed along timelines.

In one embodiment, Bob also imports associated motion capture data associated with the movement of the bus across the screen. According to one embodiment, control points are automatically created at points along the sound timeline that correspond to changes in the bus's direction. Further, control point vectors are automatically created and set to correspond to the intervening movements of the bus. Accordingly, these control points and control point vectors are now available for Bob to manipulate and fine tune.

In one embodiment, at step 420, the sound automation tool extracts and displays sound property settings encoded in the sound file. According to one embodiment, the sound automation tool also display in the sound-editing user interface a predetermined number of control points illustrating the sound properties at intervals along the sound timeline.

In Bob's case, Bob opens a sound file of a bus moving. The sound file is displayed in the sound-editing user interface of his sound automation tool. The sound is displayed as a sound wave along a horizontal timeline. In this example, the timeline includes a series of numbers from 0 to 10 representing each second of the sound clip. Bob wants to design the sound clip to create the sense, in a typical surround sound environment, that the bus is coming from the left and crossing the screen to the right. Accordingly, Bob uses controls within the sound automation tool to select a sound property mode that allows him to edit the sound location of the sound clip.

Switching to a sound location mode allows Bob to visually see where the sound is located with respect to a surround sound environment at various points in time. In one embodiment, Bob can further enhance his view of the sound wave by selecting user interface controls in the sound-editing user interface to zoom in or out on the sound wave. In one embodiment, zooming in and out on the sound wave allows Bob to precisely see and place control points along the sound wave.

At step 430, a sound editor may insert control points at desired locations along the sound wave of the displayed sound file. In one embodiment, the sound editor creates new control points by single clicking along the sound wave. Single-clicking on the sound wave, in this instance, tells the sound automation tool to create a control point at that particular point in time along the timeline. In response to the single-click, the sound-editing user interface updates the sound wave to show the newly added control point. Note that in the sound-editing user interface may allow the sound editor to insert control points in other ways, such as through keyboard commands, double-clicks, or through some other form of input.

In one embodiment, the sound file may have existing control points when opened. Those existing control points may be from a previous sound design, or alternatively, may be generated automatically at predetermined intervals by the sound automation tool. For example, upon opening a sound file, the sound automation tool may create and instruct the sound-editing user interface to display control points at regular time intervals. Alternatively, the control points may be automatically generated based on other factors than just time. For example, the automatically generated control points may be created and inserted at points where there is a change in the sound wave curvature, when a certain preset sound property values is identified, and other such factors.

As mentioned above, when a control point is created, in one embodiment, a property marker is also generated by the sound automation tool and inserted on the newly created control point. The property markers indicate the setting of the selected sound property at that particular point in time.

For example, after Bob has opened a sound file in his sound automation software, he inserts several control points along the timeline. He does this by single-clicking his mouse on the timeline at each point he would like to insert a control point. The single-click, in this instance, tells the sound automation tool that Bob wants to insert a control point at the position of the mouse point at the time of the click. Accordingly, new control points are inserted in the sound-editing user interface by the sound automation tool at the positions Bob indicates.

Specifically, suppose Bob wants to edit the bus moving sound to make it appear that the bus is traveling from left to right across the screen. To create the feeling that the sound originates on the left, Bob, first creates a control point at time interval 0 (e.g., the very beginning of the sound clip) so he can edit the sound location settings of the sound clip at that point to start from the left. Bob also creates additional control points at each second along the sound wave's timeline. He does this so he can manually edit the sound clip so the bus moving sound smoothly transitions from the left to the right as the bus crosses the screen.

At step 440, the sound editor can modify the settings for the selected sound property. In one embodiment, the sound editor does this by adjusting the location of the property marker on a control point using user interface controls provided in the sound-editing user interface.

In the present example, Bob wants to adjust the location of the sound at the first control point. In one embodiment, assume the property marker for the control point at time 0 is located at the center of the control point. This indicates that the sound's location is the center of the surround sound system. Bob wants to change the sound's location at time 0 to start from the far left; therefore, he clicks the control point. In one embodiment, clicking the control point causes the sound-editing user interface to highlight the selected control point and turn it to face Bob. Once the control point faces Bob, he can click on the property marker to move and drag it to a new location on the control point. In this case, he drags the property marker to the left until it is located where he would like the sound to start from. In one embodiment, Bob also modifies other sound properties by selecting different sound property modes. In each case, the selected sound property is displayed at the control point and Bob modifies the settings using user interface controls provided in connection with the control point by the sound-editing user interface.

After adjusting the sound location property on the first control point, Bob proceeds to make adjustments to the sound location property on subsequent control points. For example, Bob adjusts the sound property settings at the control point positioned at time interval 1 to be slightly to the right of the sound property at time interval 0. At time interval 5, Bob positions the sound location property marker to be in the front-center of the control point to provide the sense that the bus is directly in front of a listener. Bob repeats the process until the sound location property has been set at each control point to give the impression that a bus is movie from left to right.

Working With Control Point Vectors

In FIG. 4, at step 450, a sound editor can adjust the control point vectors (e.g., lines) between control points to fine tune the sound clip and make it smooth. In one embodiment, the sound editor adjusts the transitions between control points using user interface controls provided in the sound-editing user interface. For example, after Bob sets the sound properties as discussed above, in one embodiment, he plays the sound back using a playback feature of the sound automation tool to see if the sound properties have been properly set. Suppose, that during playback, Bob notices that there are some uneven sound transitions that make the bus moving clip sound stunted. In one embodiment, Bob edits the transitions between control points using controls provided in the sound-editing user interface.

In one embodiment, Bob adjusts the control point vectors by selecting a control point vector mode in the sound-editing user interface. In that mode, Bob can click at a point between two control points and drag and adjust the sound wave to smooth the sound transition between the control points. For example, the control point vector between time interval 0 and time interval 1, in one embodiment, is s-shaped, meaning that the transition from the sound location defined at time interval 0 and the sound location defined at time interval 1 have an extreme shift in location between the two control points.

Between the control point at time interval 0 and the control point at time interval 1, the sound location starts at the far left, transitions to the far right, and then returns to the location defined by the property marker on the control point at time interval 1. Accordingly, Bob clicks on the sound wave (or alternatively, on the control point vector) and adjusts it so the transition between control points is not so extreme. In one embodiment, he smoothes it out into a straight line.

Automated Flags and Corrections

In one embodiment, the sound automation tool analyzes the sound property setting Bob defines and flags extreme shifts in values between control points. In one embodiment, if control points are defined close together (e.g., to the extent that control points begin to overlap each other, then the sound automation tool may perform a variety of actions to smooth the sound transition between control points. For example, the sound automation tool may automatically adjust the sound property settings, adjust the transition between control points, eliminate overlapping control points, prompt the user to modify certain control points, etc.

In the example above, where the sound wave between the control point at time interval 0 and the control point at time interval 1 is extreme, in one embodiment, the sound automation tool smoothes the transition using an algorithm that determines a new set of sound location values that are incrementally to the right of the far left location defined at time interval 0 and to the left of the sound location defined at time interval 1.

In one embodiment, if control points overlap, then the sound automation tool removes or combines some of the control points.

EXAMPLE OF POST-EDITING OPERATIONS

At step 460, the sound editor completes editing the sound file and saves it. In one embodiment, the sound editor exports the sound file to be used in connection with a movie, sound system, or other form of entertainment media.

According to one embodiment, the defined set of control points and their corresponding sound property settings may be saved in a template to be applied to other sound files.

Bob completes his sound file design of the bus moving from left to right. Accordingly, he saves the sound file. In one embodiment, the adjusted sound property settings are encoded on the sound file. According to one embodiment, Bob can then export the sound file, for example, to 3D animation movie software or other multimedia development software. Once the sound file has been exported to the 3D animation movie software, Bob can associate the bus moving sound with the corresponding 3D visual objects in the animated movie.

Hardware Overview

Embodiments of the invention may be implemented on a computer system. The computer system includes a bus or other communication mechanism for communicating information, and a processor coupled with bus for processing information. The computer system also includes a main memory, such as a random access memory (RAM) or other dynamic storage device, coupled to the bus for storing information and instructions to be executed by the processor. The main memory 306 also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The computer system may be coupled via the bus to a display, such as a cathode ray tube (CRT), for displaying information to a computer user. An input device, including alphanumeric and other keys, is coupled to the bus for communicating information and command selections to the processor. Another type of user input device is a cursor control, such as a mouse, a trackball, or cursor direction keys for communicating direction information and command selections to the processor and for controlling cursor movement on the display. This input device typically has two degrees of freedom in two axes, a first axis (e.g., x) and a second axis (e.g., y), that allows the device to specify positions in a plane.

The invention is related to the use of the computer system for implementing the techniques described herein. According to one implementation of the invention, those techniques are performed by the computer system in response to the processor executing one or more sequences of one or more instructions contained in the main memory. Such instructions may be read into the main memory from another machine-readable medium, such as the storage device. Execution of the sequences of instructions contained in the main memory causes the processor to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operate in a specific fashion. In an implementation implemented using the computer system, various machine-readable media are involved, for example, in providing instructions to the processor for execution. Such a medium may take many forms, including but not limited to, nonvolatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CDROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface.

The received code may be executed by the processor as it is received, and/or stored in the storage device, or other non-volatile storage for later execution. In this manner, the computer system may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method implemented in a computer having at least one processor and at least one memory, the method comprising:
   displaying a first graphical representation of a waveform line;
   wherein the waveform line represents a spatial location of audio over a duration;
   wherein the first graphical representation has a first axis representing time during the duration and a second axis representing spatial location of audio;
   receiving input indicating a particular time point along the first axis;
   in response to the input, displaying, on the first graphical representation, at a position along the first axis corresponding to the particular time point, a second graphical representation that represents, in at least two-spatial dimensions, the spatial location of the audio at the particular time point;
   wherein the first axis represents, with respect to the second graphical representation, a first spatial dimension of the at least two-spatial dimensions; and
   wherein the second axis represents, with respect to the second graphical representation, a second spatial dimension of the at least two-spatial dimensions.

2. The method of claim 1, wherein the second graphical representation represents the spatial location of the audio at the particular time point in three spatial dimensions.

3. A non-transitory machine-readable medium storing instructions which, when executed by a computer having at least one processor and at least one memory, causes the computer to perform the method of claim 2.

4. The method of claim 1, wherein the second graphical representation comprises a graphical representation of a multi-dimensional surround sound environment.

5. The method of claim 4, wherein displaying the second graphical representation on the first graphical representation comprises displaying the second graphical representation on the first graphical representation such that the waveform line appears to intersect the multi-dimensional surround sound environment at a point indicating the spatial location of the audio at the particular time point.

6. A non-transitory machine-readable medium storing instructions which, when executed by a computer having at least one processor and at least one memory, causes the computer to perform the method of claim 5.

7. A non-transitory machine-readable medium storing instructions which, when executed by a computer having at least one processor and at least one memory, causes the computer to perform the method of claim 4.

8. The method of claim 1, wherein displaying the first graphical representation comprises displaying the first graphical representation such that the waveform line is displayed substantially horizontally.

9. A non-transitory machine-readable medium storing instructions which, when executed by a computer having at least one processor and at least one memory, causes the computer to perform the method of claim 8.

10. The method of claim 1, wherein displaying the first graphical representation comprises displaying a graphical representation of a timeline corresponding to the first axis.

11. A non-transitory machine-readable medium storing instructions which, when executed by a computer having at least one processor and at least one memory, causes the computer to perform the method of claim 10.

12. The method of claim 1, wherein the input is provided by a user.

13. A non-transitory machine-readable medium storing instructions which, when executed by a computer having at least one processor and at least one memory, causes the computer to perform the method of claim 12.

14. The method of claim 1, wherein displaying the second graphical representation comprises displaying user interface controls for specifying a new spatial location of the audio at the first particular time point.

15. A non-transitory machine-readable medium storing instructions which, when executed by a computer having at least one processor and at least one memory, causes the computer to perform the method of claim 14.

16. A non-transitory machine-readable medium storing instructions which, when executed by a computer having at least one processor and at least one memory, causes the computer to perform the method of claim 1.

17. A method implemented in a computer having at least one processor and at least one memory, the method comprising:
   displaying a first graphical representation of a waveform line;
   wherein the waveform line represents a spatial location of audio over a duration;
   wherein the first graphical representation has a first axis representing time during the duration and a second axis representing spatial location of audio;
   receiving first input indicating a first particular time point along the first axis;
   in response to the first input, displaying, on the first graphical representation, at a position along the first axis corresponding to the first particular time point during the duration, a second graphical representation that represents, in at least two-spatial dimensions, a spatial location of the audio at the first particular time point;
   receiving second input indicating a second particular time point along the first axis;
   in response to the second input, displaying, on the first graphical representation, at a position along the first axis corresponding to the first particular time point during the duration, a third graphical representation that represents, in at least two-spatial dimensions, a spatial location of the audio at the second particular time point;
   wherein the second graphical representation and the third graphical representation are displayed concurrently on the first graphical representation.

18. The method of claim 17, further comprising: receiving third input that comprises a specification of how the audio should transition from the spatial location of the audio at the first particular time point to the spatial location of the audio at the second particular time point; and in response to the third input, storing data that represents the specification of how the audio should transition from the spatial location of the audio at the first particular time point to the spatial location of the audio at the second particular time point.

19. A non-transitory machine-readable medium storing instructions which, when executed by a computer having at least one processor and at least one memory, causes the computer to perform the method of claim 18.

20. The method of claim 17, wherein the input is provided by a user.

21. A non-transitory machine-readable medium storing instructions which, when executed by a computer having at least one processor and at least one memory, causes the computer to perform the method of claim 20.

22. The method of claim 17, wherein displaying the second graphical representation comprises displaying user interface controls for specifying a new spatial location of the audio at the first particular time point, and wherein displaying the third graphical representation comprises displaying user interface controls for specifying a new spatial location of the audio at the second particular time point.

23. A non-transitory machine-readable medium storing instructions which, when executed by a computer having at least one processor and at least one memory, causes the computer to perform the method of claim 22.

24. The method of claim 17, wherein displaying the second graphical representation comprises displaying user interface controls for specifying how the audio should transition from the spatial location of the audio at the first particular time point to the spatial location of the audio at the second particular time point.

25. A non-transitory machine-readable medium storing instructions which, when executed by a computer having at least one processor and at least one memory, causes the computer to perform the method of claim 24.

26. The method of claim 17, wherein displaying the second graphical representation comprises displaying user interface controls for specifying how the audio should transition from the spatial location of the audio at the second particular time point to the spatial location of the audio at the first particular time point.

27. A non-transitory machine-readable medium storing instructions which, when executed by a computer having at least one processor and at least one memory, causes the computer to perform the method of claim 26.

28. The method of claim 17,
wherein displaying the first graphical representation comprises displaying a graphical representation of a timeline corresponding to the first axis.

29. A non-transitory machine-readable medium storing instructions which, when executed by a computer having at least one processor and at least one memory, causes the computer to perform the method of claim 28.

30. The method of claim 17, wherein displaying the first graphical representation comprises displaying the first graphical representation such that the waveform line is displayed substantially horizontally.

31. A non-transitory machine-readable medium storing instructions which, when executed by a computer having at least one processor and at least one memory, causes the computer to perform the method of claim 30.

32. The method of claim 17, wherein the second graphical representation represents the spatial location of the audio at the first particular time point in three spatial dimensions, and wherein the third graphical representation represents the spatial location of the audio at the second particular time point in three spatial dimensions.

33. A non-transitory machine-readable medium storing instructions which, when executed by a computer having at least one processor and at least one memory, causes the computer to perform the method of claim 32.

34. A non-transitory machine-readable medium storing instructions which, when executed by a computer having at least one processor and at least one memory, causes the computer to perform the method of claim 17.

* * * * *

UNITED STATES PATENT AND TRADEMARK OFFICE
CERTIFICATE OF CORRECTION

| | | |
|---|---|---|
| PATENT NO. | : 7,957,547 B2 | Page 1 of 1 |
| APPLICATION NO. | : 11/450030 | |
| DATED | : June 7, 2011 | |
| INVENTOR(S) | : Robert Chin | |

It is certified that error appears in the above-identified patent and that said Letters Patent is hereby corrected as shown below:

In column 1, line 19, delete "modem" and insert -- modern --, therefor.

In column 12, line 67, delete "memory 306" and insert -- memory --, therefor.

In column 16, line 39, in claim 17, delete "first particular" and insert -- second particular --, therefor.

In column 16, line 41, in claim 17, delete "in at" and insert -- in the at --, therefor.

Signed and Sealed this
Sixth Day of December, 2011

David J. Kappos
*Director of the United States Patent and Trademark Office*